Patented Nov. 8, 1949

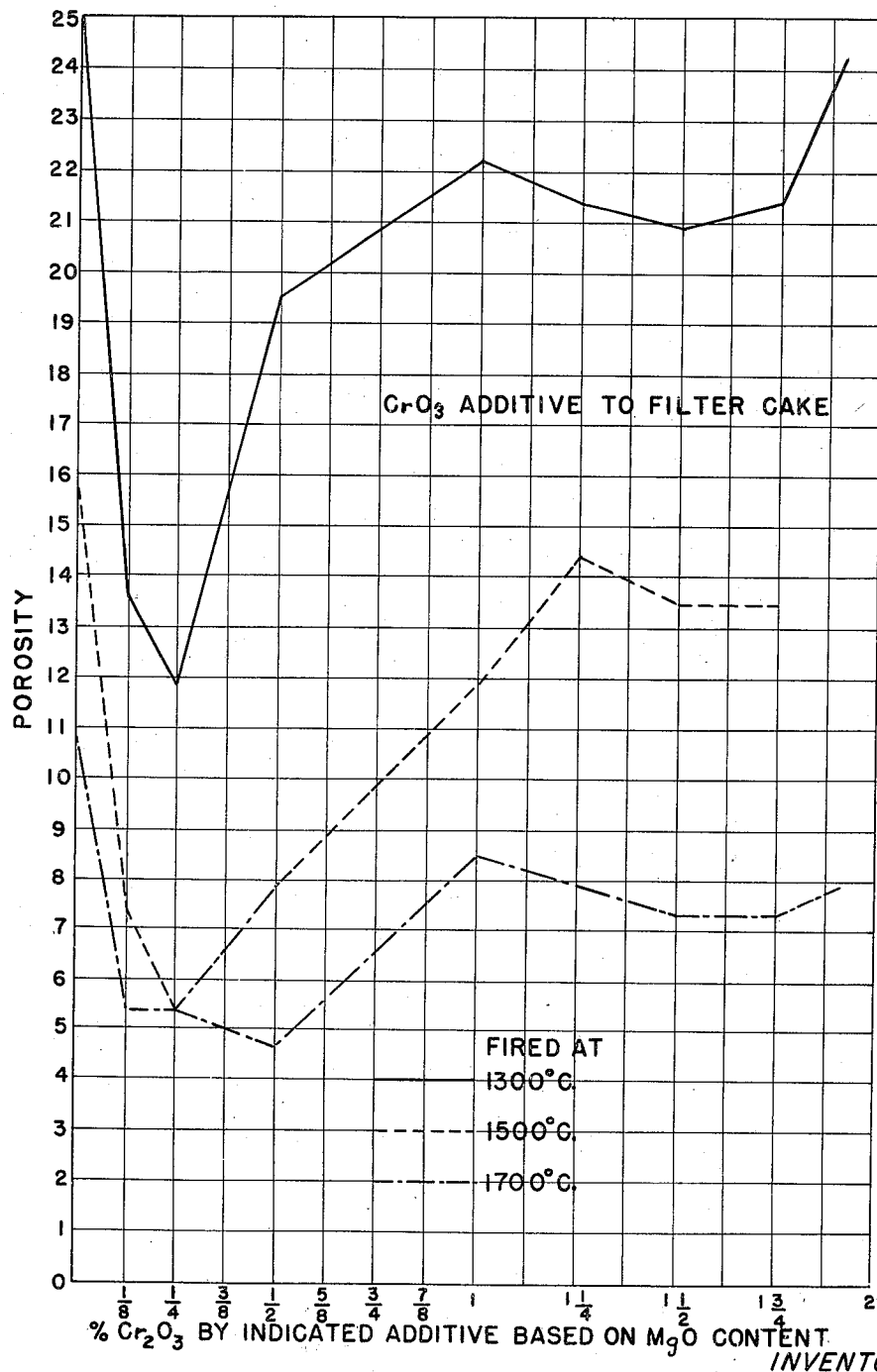

2,487,290

UNITED STATES PATENT OFFICE 2,487,290

CATALYTIC CRYSTALLIZATION OF MAGNESIUM OXIDE

Leslie W. Austin, San Jose, and James C. Hicks and Clarence A. Rick, Menlo Park, Calif., assignors to The Permanente Metals Corporation, Oakland, Calif., a corporation of Delaware Application June 20, 1947, Serial No. 755,928

20 Claims. (Cl. 23—304)

This invention relates to a method of forming crystalline magnesium oxide of high purity and of high density, with decreased effective surface, with the aid of a catalyst which enables crystallization to take place at temperatures much lower than those previously considered operable for material of comparable purity.

Magnesium oxide in the pure state has been very difficult to prepare in crystalline form, heating to temperatures in excess of 2000° C. commonly being required for acceptable crystallization of even the technically pure grade. Even when fired as high as about 2200° C. the best non-fused product commercially available today has an apparent porosity of about 11% as measured by mercury displacement. Since such temperatures are very difficult to attain in fuel-fired furnaces, and since such porosity is higher than is acceptable for many purposes, crystalline magnesia of purity better than about 95% MgO is ordinarily prepared by fusion in electric furnaces. Such fusion is a difficult process and yields an expensive product which is relatively inert and unsatisfactory for some purposes. For example, it is very difficult to bond together to form high temperature ceramic articles.

In order to allow crystallization of the magnesia to take place at lower temperatures, such as those attainable in a rotary kiln, e. g., 1800° C. or less, it has been the practice to employ an admixture of from 5 to 15 percent of impurities such as silica, lime, alumina, and iron oxide along with the magnesia. These impurities flux with the magnesia, allowing sintering and crystallization to take place at temperatures within the range from about 1550° C. to 1800° C. depending upon the amount and kind of additives. Even with the larger amounts of impurities, the highest temperatures are required to produce a material having practically negligible residual shrinkage, i. e., under about 5% porosity.

Although useful in allowing the burning of the magnesia to be done at lower temperatures, the presence of the large amounts of impurities in the magnesia is objectionable for many purposes, as for example where danger exists of chemical contamination. When the crystalline magnesia material is to be used for ceramic or refractory purposes, the impurities markedly reduce the overall refractoriness of the material, and even more markedly lower its ability to bear load at high temperatures and its resistance to thermal spalling and to corrosion by acidic materials.

A primary object of this invention is to provide a method for forming crystallized magnesia of increased density and of decreased effective surface. It is also an object of this invention to provide well crystallized magnesium oxide of high purity without resorting to fusion or the addition of fluxes. Another object is to provide a method of forming crystalline, high purity magnesia at temperatures attainable in fuel-fired furnaces and, if desired, at high production rates. A further object is to provide a method whereby formation of crystalline magnesia from magnesia-yielding materials proceeds substantially to completion at much lower temperatures and more rapidly than has heretofore been possible with magnesia of comparable purity.

This invention is predicated upon the discovery that very small amounts of chromium compounds serve the purpose of a catalyst or mineralizer in the formation of crystalline magnesia, more particularly if the magnesia-yielding material is of high purity, that is, contains 95% or more MgO on the ignited basis. It has been found that amounts of chromium compounds adapted to yield not more than about 2% $Cr_2O_3$ in the fired product result in better crystallization of magnesium oxide at a given temperature, or equivalent crystallization at a lower temperature, when compared to similar material without the chromium compound additions. The quantities of chrome-yielding additives required to improve the crystallization of magnesium oxide are very low, in terms of $Cr_2O_3$ in the analysis of the fired material, $\frac{1}{3}$ of one percent or less being the optimum value in some cases. The preferred range is in general from about $\frac{1}{3}$ of 1% to 1% $Cr_2O_3$ added, on the ignited analysis, but the amount may vary depending upon the degree of dispersion in the magnesia-yielding material, the physical and chemical nature of the starting material, and the conditions of firing. With poorer dispersion larger amounts of the additive may be required to produce an equivalent improvement in the crystallization. In general, the more pure the magnesia-yielding material, the greater the improvement in crystallization afforded by the chrome addition. The best crystallization and the lowest apparent porosities have been obtained from the purest starting materials and with less than $\frac{1}{2}$ of 1% $Cr_2O_3$ in the fired analysis.

The method of this invention comprises admixing finely divided magnesium compound adapted to yield magnesia upon firing and a small amount of chromium compound, to form a uniform dispersion of the chromium compound in the magnesium compound, and then heating to form crystalline magnesia.

The magnesia-yielding compound is finely divided, and a preferred starting material is precipitated magnesium hydroxide or magnesium carbonate. Another suitable starting material is a finely divided hydrated magnesia, which can, for instance, be made into a slurry in water.

The chromium compounds useful in this invention are preferably added in thorough and intimate admixture with the magnesia-yielding compound. This is advantageously effected by adding the chrome compound in solution. Water is a preferred solvent for the chrome compound but any other solvent therefor can be used. For instance, chromic sulfate in one form is more soluble in alcohol than in water, and in such case alcohol can be employed as the solvent, or liquid dispersing medium. The chromium compounds which can be added in the method of this invention include for example, chromic acid, magnesium chromate and dichromate, ammonium chromate and dichromate, chromium sulfate, chromium chloride, chromium nitrate, the chromates and dichromates of the alkali metals, the chromates and dichromates of the alkaline earth metals, chromium acetate, etc.

It is an advantage of the present invention that a mixture of the materials as described herein can be fired to crystallization equilibrium at a temperature about 400° C. below that required heretofore for firing magnesia of such purity. It is also an advantage that a denser product is obtained as measured in weight per unit volume. Furthermore, larger crystals are obtained than are obtained when the same magnesia is fired without the addition of chromium compound. For instance, a batch of crystals is prepared by firing magnesium hydroxide admixed with chromic acid to give 0.25% $Cr_2O_3$, and a second batch is prepared by firing in exactly the same way the same magnesium hydroxide without addition of any chrome. The crystals of the first batch have an average diameter 2.2 times that of the second batch. Crystalline magnesia prepared according to this invention also has very low apparent porosity.

The crystals of magnesia produced by the present process are polygonal in shape and are approximately equidimensional. The fragments produced by crushing the larger pieces of crystal aggregates to useful sizes are also approximately equidimensional, and they are also angular, dense and strong, and are therefore especially suitable for packing into dense shaped bodies. When chromium compounds containing the chromium in the positive radical are added in the mixtures, the particles obtained upon firing and crushing are especially tough and therefore resistant to abrasion and impact. The effect upon the porosity of the product is demonstrated by Figure 1 wherein porosity, in percent by volume, is plotted against the $Cr_2O_3$ content as indicated. This figure shows results obtained in a series of tests wherein chromium trioxide is added to a hydroxide suspension, in amounts to give the $Cr_2O_3$ content indicated, and the mixture dried and portions thereof fired at 1300° C., 1500° C., and 1700° C. respectively. In two similar series of tests run in the same way, but with addition of chromium chloride in one series and of $Na_2Cr_2O_7 \cdot 2H_2O$ in the other, similar curves were obtained. In all cases, above about 2.0% $Cr_2O_3$, the porosities level off at porosities slightly below that of the untreated magnesia-yielding material.

The examples given below demonstrate more clearly the mode of carrying out this invention.

*Example 1*

A magnesium hydroxide sludge is obtained by treating seawater with calcined dolomite to precipitate magnesium hydroxide, and then purifying the precipitate by washing with fresh water to remove soluble salts of lime and other contaminants. The sludge recovered has a pulp density of about 20% solids. A typical analysis of the solids on the ignited basis is as follows: 1.18% $SiO_2$, 0.31% $Al_2O_3$, 0.39% $Fe_2O_3$, 1.12% CaO, 97.0% MgO (by difference). Ignition loss of the dried solids is 31.18%. To this sludge is added sufficient chromic chloride to yield 0.25% $Cr_2O_3$ in the fired product. The sludge and chromic chloride are intimately blended, the salt going into solution in the water of the sludge, and the mixture is then dried, for example in a rotary drier. The dry solids are then briquetted to form hard pellets. These pellets are fired in a suitable kiln, for example, a rotary kiln or a shaft kiln, to 1700° C. to 1800° C., the pellets being in the hot zone for at least 20 to 30 minutes. The fired product is hard, tough, and well-crystallized, showing an apparent porosity of about 5.4% as determined by mercury displacement on a sample of sizes passing 6 mesh and retained on 10 mesh, using vacuum to remove entrained air. This product crushes to fragments which are approximately equidimensional, whereas material prepared in the same way but without the addition of chromium compound crushes to weaker needle-like fragments, more difficult to pack densely.

Another series of products is prepared in the same manner as described above except that varying amounts of chromic acid ($CrO_3$) are added to the magnesium hyroxide suspension. The dried compositions, containing from 0 to 1.0% by weight of chromium calculated as $Cr_2O_3$, on the ignited basis, are fired at 1700° C. for one-half hour. Portions of the resulting magnesias are tested for porosity by mercury displacement as above and other portions are prepared in thin section and examined under the microscope as to crystal structure. The porosities corresponding to the $Cr_2O_3$ content are as follows: 0.0% $Cr_2O_3$, porosity 10.25%; ⅛% $Cr_2O_3$, porosity 4.16%; ¼% $Cr_2O_3$, porosity 3.45%; ½% $Cr_2O_3$, porosity 4.75%; 1.0% $Cr_2O_3$, porosity 7.3%. Porosities are expressed in this specification in percent by volume. In examining the thin sections the average is determined, in each, of the maximum dimension of 50 of the largest crystals. These average dimensions corresponding to chrome additions are as follows: 0.0% $Cr_2O_3$, average crystal dimension 0.0208 mm.; ⅛% $Cr_2O_3$, average crystal dimension 0.043 mm.; ¼% $Cr_2O_3$, average crystal dimension 0.0462 mm.; ½% $Cr_2O_3$, average crystal dimension 0.0417 mm.; 1.0% $Cr_2O_3$, average crystal dimension 0.0265 mm. It can be seen that the degree of crystallization, as indicated by crystal size, closely parallels the decrease in porosity. It is therefore believed valid to consider porosity as a measure of the degree of crystallization as well as an indication of the residual shrinkage. The above data indicate the decrease in effective surface of the magnesia with addition of chrome, due to increased crystal size. As shown in the figure, it is found that the porosities again decrease when the $Cr_2O_3$ content is increased to over 1.0% up to about 2.0%. Above about 2.0%, the porosity appears to level off at somewhat below the porosity of the magnesia fired without the addition of chrome.

Example 2

Calcined oyster shells are treated with water to produce a slurry of calcium hydroxide. This slurry is then blended with suitable amounts of seawater or other magnesium-containing brines to produce a precipitate of magnesium hydroxide and a solution of calcium chloride. The magnesium hydroxide precipitate is washed to substantially free it from the soluble salts, and is then treated with carbon dioxide to produce the soluble magnesium bicarbonate. Residual lime is thereby precipitated as the carbonate and is filtered off along with other insoluble material. The magnesium bicarbonate solution is then boiled, driving off some of the carbon dioxide and precipitating the magnesium as the insoluble carbonate. A typical analysis of the dry solids at this stage, on the ignited basis, is as follows: 0.46% $SiO_2$, 0.17% $Al_2O_3$, 0.12% $Fe_2O_3$, 1.39% CaO, and 97.86% MgO (by difference). The ignition loss is 55.39%.

To the magnesium carbonate slurry is added sufficient chromic acid ($CrO_3$) to yield ¼% $Cr_2O_3$ in the fired material. The acid is added as a concentrated solution, and is thoroughly blended with the precipitate prior to drying. The dried precipitate is pelleted and then is advantageously fired high enough to decompose the carbonate at a relatively slow rate of heating so as to minimize disruption of the pellet structure, after which the heating can continue more rapidly to about 1700° C., which temperature is maintained for about one-half hour. Upon cooling, the material is well crystallized and has a porosity of about 4.5% by mercury displacement.

Example 3

A finely divided active magnesia prepared by calcining precipitated magnesium hydroxide to between about 500° C. and 700° C. for about 2 hours has the following typical analysis: 1.05% $SiO_2$, 0.17% $Al_2O_3$, 0.30% $Fe_2O_3$, 1.20% CaO, 97.28% MgO (by difference) on the ignited basis. The powder is made into a slurry with water, and sufficient chromic acid is thoroughly blended in to introduce ¼% $Cr_2O_3$ in the fired composition. The mixture is dried, compacted into shapes and fired to 1725° C. for one-half hour. The resulting magnesia material is dense, well crystallized, and has a porosity of 4.3%.

Example 4

Magnesium hydroxide slurry similar to that employed in Example 1 is blended with sufficient finely divided chromium sesquioxide powder, $Cr_2O_3$, to give ½% $Cr_2O_3$ in the analysis of the fired material. Further treatment, including the firing, is similar to Example 1. The fired material is well crystallized and has a porosity of 5.6%.

Example 5

A high purity magnesium hydroxide powder analyses, on the ignited basis, 0.11% $SiO_2$, 0.11% $R_2O_3$, no CaO, and 99.78% MgO (by difference). This material is mixed in suspension in water with sufficient sodium dichromate to yield ½% $Cr_2O_3$ in the fired analysis. The mixture is then dried, pelleted and fired to 1800° C. The product is well crystallized and dense, having a porosity of 5.9% as determined by the kerosene displacement method.

Example 6

A precipitated magnesium hydroxide sludge is prepared as in Example 1, and with this material is blended sufficient of a solution of sodium dichromate to yield a product analysing 0.31% $Cr_2O_3$ on the ignited basis. The mixture is fed directly to a rotary kiln and fired to about 1700° C. The product is well crystallized in magnesia in the form of rounded, shot-like granules ranging in size from about 4-mesh to 40-mesh, and having a porosity in the 6 to 10-mesh portion of 9.5%. For comparison, the porosity of magnesia from the same magnesium hydroxide sludge and with the same treatment but omitting the chromium salt addition is about 19.7%.

The manner in which the invention functions to bring about better development of the crystallization of highly pure magnesias at lower temperatures is not completely understood, and it is therefore not desired to be limited by the following discussion which is given as being of possible aid in understanding and applying the invention. When magnesia-yielding materials, particularly precipitated substances which, upon heating or firing, yield magnesia containing not more than 2% $SiO_2$, are so heated as to form magnesia in crystalline form, very little coalescence or crystal growth occurs and the magnesia crystals obtained are still very finely divided and of extensive surface. As stated hereinabove, electric fusion serves to form larger crystals but at high cost, and the addition of fluxing ingredients introduces substantial amounts of impurities which alter the physical and chemical characteristics of the product. It is apparent that the chromium compound does not act in the manner of a fluxing agent because the optimum amounts employed are too small, increasing amounts yield higher porosities, and, furthermore, increasing amounts of other impurities which normally act as fluxing agents tend to hinder the mineralizing action of the chrome compound. These considerations are contrary to the operation of the commonly used fluxing materials. The effect of adding the chromium compound is evidently not to cause fusion or sintering because the effect is apparently greater on higher purity material. The figure demonstrates the striking decrease in porosity effected upon firing at 1300° C., which is far below a sintering temperature for the materials employed. The phenomenon is considered to be a catalytic or mineralizing effect because it has been observed that the small chrome-yielding additions initiate crystallization of magnesia at lower temperatures, mature the crystallization more rapidly, and produce better crystallization than is obtained with the untreated magnesia. This invention enables the production of well-crystallized magnesia by firing under conditions usually attainable in the rotary kiln, that is, at temperatures not over about 1800° C. and for periods not exceeding about an hour. The product, because of its dense structure, high purity, low residual shrinkage, and toughness, is desirable for use in a number of fields. It is highly useful, for instance, for refractories, heat-exchange media and abrasives.

In this specification and claims porosity where expressed is in percentage by volume and other percentages and parts are by weight.

In conformity with common practice in reporting chemical analyses of refractory materials, in the specification and claims the proportions of the various chemical constituents present in a material are given as though these constituents were present as the simple oxides. Thus, the magnesium constituent is referred to as magnesium oxide or MgO, the chromium constituent as $Cr_2O_3$, the silicon constituent as $SiO_2$, and so on for other elements reported, although the silica or chrome and a very small proportion of the MgO, for example, may be present in combination with each other or with another minor constituent. For example, the term "2.0% by weight of chromium as, or calculated as, $Cr_2O_3$" is intended to mean that a chemical analysis of the material referred to would show the chromium content as 2.0% expressed as $Cr_2O_3$, although in reality all of the chromium might be present in the form of magnesium chromite or in some other combined form.

What is claimed is:

1. Process for preparing crystalline magnesia which comprises uniformly admixing a finely divided magnesium compound adapted to yield magnesia upon firing and a chromium compound in an amount adapted to provide up to 2% by weight of chromium calculated as $Cr_2O_3$ in the fired product, and firing the mixture to form crystalline magnesia.

2. Process for preparing crystalline magnesia which comprises uniformly admixing a precipitated magnesium compound adapted to yield magnesia upon firing and a chromium compound in an amount adapted to provide up to 2% by weight of chromium calculated as $Cr_2O_3$ in the fired product, and firing the mixture to form crystalline magnesia.

3. Process as in claim 2 wherein the magnesium compound is precipitated magnesium hydroxide.

4. Process as in claim 2 wherein the magnesium compound is precipitated magnesium carbonate.

5. Process as in claim 2 wherein the chromium compound is chromic acid.

6. Process as in claim 2 wherein the chromium compound is a chromium salt having chromium in the positive radical.

7. Process as in claim 2 wherein the chromium compound is a salt of chromic acid.

8. Process for preparing crystalline magnesia which comprises admixing a precipitated magnesium compound adapted to yield magnesia upon firing and a solution of a chromium compound in an amount adapted to yield up to 2% by weight of chromium as $Cr_2O_3$ in the fired product, removing excess liquid, and firing to form crystalline magnesia.

9. Process for preparing crystalline magnesia which comprises admixing a precipitated magnesium compound adapted to yield magnesia upon firing and a water solution of a chromium compound in an amount adapted to provide up to 2.0% by weight of chromium as $Cr_2O_3$ in the fired product, and firing the mixture to form crystalline magnesia.

10. Process as in claim 9 wherein the magnesium compound is magnesium hydroxide.

11. Process as in claim 9 wherein the magnesium compound is magnesium carbonate.

12. Process as in claim 9 wherein the chromium compound is a salt of chromic acid.

13. Process as in claim 9 wherein the chromium compound is chromic acid.

14. Process as in claim 9 wherein the chromium compound is a salt having chromium as the positive radical.

15. Process for crystallizing magnesia which comprises hydrating magnesia, intimately admixing therewith a chromium compound in an amount adapted to provide up to 2.0% by weight of chromium calculated as $Cr_2O_3$ in the fired product, and heating the mixture to form crystalline magnesia.

16. Process for preparing crystalline magnesia which comprises uniformly admixing a finely divided magnesium compound adapted to yield magnesia upon firing and a chromium compound in an amount adapted to provide up to 2.0% by weight of chromium calculated as $Cr_2O_3$ in the fired product, and firing the mixture at not over 1800° C. to form dense crystalline magnesia.

17. Process for preparing crystalline magnesia which comprises uniformly admixing a finely divided magnesium compound adapted to yield magnesia upon firing and a chromium compound in an amount adapted to provide up to 2.0% by weight of chromium calculated as $Cr_2O_3$ in the fired product, and firing the mixture at not over 1800° C. for not more than one hour to form crystalline magnesia of low porosity.

18. Dense, non-fused periclase material being essentially crystalline magnesium oxide in combination with uniformly dispersed chromic oxide and analysing not over 2.0% by weight $Cr_2O_3$.

19. Process for preparing crystalline magnesia which comprises uniformly admixing a finely divided magnesium compound adapted to yield magnesia upon firing and a chromium compound in an amount adapted to provide up to 2% by weight of chromium calculated as $Cr_2O_3$ in the fired product, compacting said admixture, and firing said compacted admixture to form crystalline magnesia.

20. Process for preparing crystalline magnesia which comprises uniformly admixing a finely divided magnesium compound adapted to yield magnesia upon firing and a chromium compound in an amount adapted to provide up to 2% by weight of chromium calculated as $Cr_2O_3$ in the fired product, pelleting said admixture, and firing said pelleted admixture to form crystalline magnesia.

LESLIE W. AUSTIN.
JAMES C. HICKS.
CLARENCE A. RICK.

REFERENCES CITED

The following references are of record in the file of this patent:

UNITED STATES PATENTS

| Number | Name | Date |
| --- | --- | --- |
| 2,053,369 | Jeffery | Sept. 8, 1936 |